United States Patent
Sjöö

(10) Patent No.: US 8,096,734 B2
(45) Date of Patent: Jan. 17, 2012

(54) MILLING CUTTER TOOL FOR CHIP REMOVING MACHINING, AS WELL AS A CUTTING BODY AND A BASIC BODY THEREFOR

(75) Inventor: Sture Sjöö, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 476 days.

(21) Appl. No.: 12/331,171

(22) Filed: Dec. 9, 2008

(65) Prior Publication Data
US 2009/0169312 A1 Jul. 2, 2009

(30) Foreign Application Priority Data
Dec. 21, 2007 (SE) ...................................... 0702867

(51) Int. Cl.
*B23F 21/16* (2006.01)
(52) U.S. Cl. ................. 407/23; 407/25; 407/26; 409/11
(58) Field of Classification Search ................... 407/35, 407/42, 20–29; 409/11
See application file for complete search history.

(56) References Cited

U.S. PATENT DOCUMENTS

| | | | | |
|---|---|---|---|---|
| 1,243,446 A * | 10/1917 | Richard | ........................... | 407/40 |
| 1,567,733 A * | 12/1925 | Hanson et al. | ................. | 408/217 |
| 2,456,842 A * | 12/1948 | Rutbell | ........................... | 407/40 |
| 4,218,159 A * | 8/1980 | Langen | ........................... | 407/25 |
| 4,655,648 A * | 4/1987 | Hellbergh | ........................ | 407/42 |
| 5,085,542 A * | 2/1992 | Nakayama et al. | ............ | 407/114 |
| 5,088,861 A * | 2/1992 | Little | ................................ | 407/11 |
| 5,112,162 A * | 5/1992 | Hartford et al. | ................. | 407/49 |
| 5,325,748 A * | 7/1994 | Ehrenberg | ......................... | 82/13 |
| 6,203,251 B1 * | 3/2001 | Oppelt et al. | .................... | 407/48 |
| 6,213,691 B1 * | 4/2001 | Leeb | ................................ | 407/34 |
| 6,499,917 B1 * | 12/2002 | Parker et al. | .................... | 407/25 |
| 2006/0216122 A1* | 9/2006 | Engstrom et al. | .............. | 407/114 |
| 2009/0162151 A1* | 6/2009 | Sjoo | ................................ | 407/35 |

FOREIGN PATENT DOCUMENTS

| | | | |
|---|---|---|---|
| DE | 4304071 C1 * | 6/1994 | |
| JP | 54158795 A * | 12/1979 | |
| SE | 526 645 | 10/2005 | |

* cited by examiner

*Primary Examiner* — Boyer D Ashley
*Assistant Examiner* — Sara Addisu
(74) *Attorney, Agent, or Firm* — Drinker Biddle & Reath LLP

(57) ABSTRACT

A milling cutter tool including a basic body and a replaceable cutting body. The cutting body includes a set of teeth which are situated with a uniform partition along one of a pair of opposite sides of the cutting body. The cutting body is fixed in a pocket having a support surface against which the underside of the cutting body is mounted. The support surface of the pocket, and the underside of the cutting body, are tipped at a negative axial angle $\gamma$ of at least 0.5° in relation to a center axis (C1) of the basic body such that the teeth of the cutting body are located along a common, phantom helical line (X), which is concentric with the center axis (C1) of the basic body and has an even pitch which corresponds to the partition between the teeth.

19 Claims, 4 Drawing Sheets

MILLING CUTTER TOOL FOR CHIP REMOVING MACHINING, AS WELL AS A CUTTING BODY AND A BASIC BODY THEREFOR

This application claims priority under 35 U.S.C. §119 to Swedish Patent Application No. 0702867-3, filed on Dec. 21, 2007, which is incorporated by reference herein in its entirety.

FIELD OF THE INVENTION

In a first aspect, the present invention relates generally to a milling cutter tool for cutting or chip removing machining of the type that includes, on one hand, a basic body having an envelope surface and two opposite ends, between which a geometrical center axis extends around which the basic body is rotatable in a predetermined direction of rotation, and, on the other hand, a replaceable cutting body, which includes a pair of opposite main surfaces, one of which in a mounted state forms an underside and the other one an upperside, a pair of opposite sides, as well as a pair of opposite end surfaces, the individual cutting body including a set of teeth, which are situated with a uniform partition along a side of the cutting body and individually include a chip surface formed adjacent to a cutting edge, from which the tooth extends between a pair of flanks and has a certain length extension, which is orientated at an angle to the underside, and the cutting body being fixed in a pocket opening in the envelope surface of the basic body having a support surface turned in the forward direction of the direction of rotation of the basic body, against which the underside of the cutting body is turned. In additional aspects, the invention also relates generally to a cutting body and a basic body, respectively, for the tool in question.

BACKGROUND OF THE INVENTION

Before the invention is described in detail, it should be mentioned that the technique for chip removing machining of above all workpieces of metal is quickly developing. When blanks or workpieces previously were machined to finished products having some complexity, such as engine components, vehicular and craft components, machine parts, etc., the manufacture was carried out in a plurality of steps or stations, which individually required separate set-ups of one and the same blank. For instance, a first machining could be one or more turning operations. If the detail also required different forms of recesses, such as keygrooves or bar grooves, the same was moved to a new set-up of another station, where milling followed. Should the same in addition be provided with different forms of holes or ducts, transfer was carried out to an additional set-up of a drilling machine or drilling station. More recent, machines were developed in which a magazine is included having a large number of tools, each one of which can be picked out of the magazine and brought to an active state for machining, and which after accomplishing the machining is brought back to the magazine to be replaced by another tool.

In order to make the manufacture more effective and reduce the times for, as well as the costs of, the machining, universal machines have recently been developed in the form of so-called MultiTask machines, in which a large number of program-controlled tools are included, which are flexibly movable in space and capable of executing multiple machining operations, such as turning, milling, drilling, grinding, etc., without the workpiece having to be removed from the machine or the set-up thereof in the same, and in which the need of time-consuming tool exchanges is reduced to a minimum. In such universal machines, partly new requirements are made on the tools in question, not only in respect of their capacity to execute conventional as well as new machining operations, but also in respect of the accessibility of the tools so far that the individual tools should be able to move in complicated paths of motion within a limited space and in spite of this be able to come into contact with those parts of the blank being machined which are difficult to access. This applies not at least to milling cutter tools, e.g., of the type that is used for the milling of notches of different types.

A previously known milling cutter tool is described in SE 0400385-1 (publication number 526.645). This known tool includes a plurality of peripherally spaced-apart cutting bodies having teeth, which are orientated perpendicularly to the underside of the individual cutting body, two or a plurality of teeth being situated in a common plane, which extends perpendicularly to the center axis of the basic body. This means that axially co-situated teeth will operate in one and the same notch in the form of a straight notch, the teeth alternately engaging the workpiece after a certain rotation of the tool. This tool is useful for a plurality of different milling operations, but not for gear hobbing.

The present invention aims at obviating the above-mentioned shortcoming of the previously known milling cutter tool and at providing a milling cutter tool, which is suitable for gear hobbing, in particular in MultiTask machines.

An object of the invention is to provide a milling cutter tool, which is designed in such a way that the same can, by simple feeding motions, be utilized for gear hobbing, in particular for the creation of bars or teeth in details having a rotationally symmetrical, usually cylindrical shape.

SUMMARY OF THE INVENTION

The invention is based on the idea of tipping in the cutting body or cutting bodies of the tool at a negative axial angle in order to locate their teeth along a common, imaginary helical line, which is concentric with the center axis of the basic body and has an even pitch, which corresponds with the partition between the teeth. In such a way, the tool can in an advantageous way be made with replaceable cutting bodies, e.g., of cemented carbide, and be utilized for gear hobbing.

In an embodiment, the invention provides a milling cutter tool including a basic body and a replaceable cutting body. The basic body includes an envelope surface and two opposite ends, between which a geometrical center axis (C1) extends around which the basic body is rotated in a predetermined direction of rotation. The replaceable cutting body includes a pair of opposite main surfaces, one of which in a mounted state forms an underside and the other one of which forms an upperside, a pair of opposite sides, and a pair of opposite end surfaces. The cutting body further includes a set of teeth which are situated with a uniform partition along one of the pair of opposite sides of the cutting body, each of the teeth including a chip surface formed adjacent to a cutting edge from which the tooth extends between a pair of flanks along a length extension which is orientated at an angle to the underside of the cutting body. The cutting body is fixed in a pocket opening in the envelope surface of the basic body and having a support surface facing the forward direction of the direction of rotation of the basic body, against which the underside of the cutting body is mounted. The support surface of the pocket, and the underside of the cutting body, are tipped at a negative axial angle (γ) of at least 0.5° in relation to the center axis (C1) of the basic body such that the teeth of the cutting body are located along a common, phantom helical line (X), which is concentric with the center axis (C1) of the basic body and has an even pitch which corresponds to the partition between the teeth.

In another embodiment, the invention provides a replaceable cutting body for a milling cutter tool. The milling cutter tool includes a basic body which includes an envelope surface and two opposite ends between which a geometrical center axis (C1) extends around which the basic body is rotated in a predetermined direction of rotation, at least one pocket opening in the envelope surface and having a support surface facing the forward direction of the direction of rotation of the basic body, against which a cutting body is seated, the support surface of the pocket being tipped at a negative axial angle ($\gamma$) of at least 0.5° in relation to the center axis (C1) of the basic body to locate teeth of the cutting body along a common, imaginary helical line (X), which is concentric with the center axis (C1) of the basic body and has an even pitch. The cutting body includes a pair of opposite main surfaces, one of which in a mounted state forms an underside and the other one of which forms an upperside, a pair of opposite sides, and a pair of opposite end surfaces. A set of teeth are situated with a uniform partition along one of the pair of opposite sides of the cutting body, each of the teeth including a chip surface formed adjacent to a cutting edge from which the tooth extends between a pair of flanks along a length extension which is orientated at an angle to the underside. Each of the teeth is cross-sectionally trapezoid by including a back surface towards which the flanks extend at obtuse angles ($\alpha$).

In yet another embodiment, the invention provides A basic body for a milling cutter tool, including an envelope surface and two opposite ends, between which a geometrical center axis (C1) extends around which the basic body is rotated in a predetermined direction of rotation, and at least one pocket opening in the envelope surface and having a support surface for seating a cutting body facing the forward direction of the direction of rotation of the basic body. The support surface of the pocket is tipped at a negative axial angle ($\gamma$) of at least 0.5° in relation to the center axis (C1) of the basic body to locate teeth of the cutting body along a common, imaginary helical line (X), which is concentric with the center axis (C1) of the basic body and has an even pitch.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
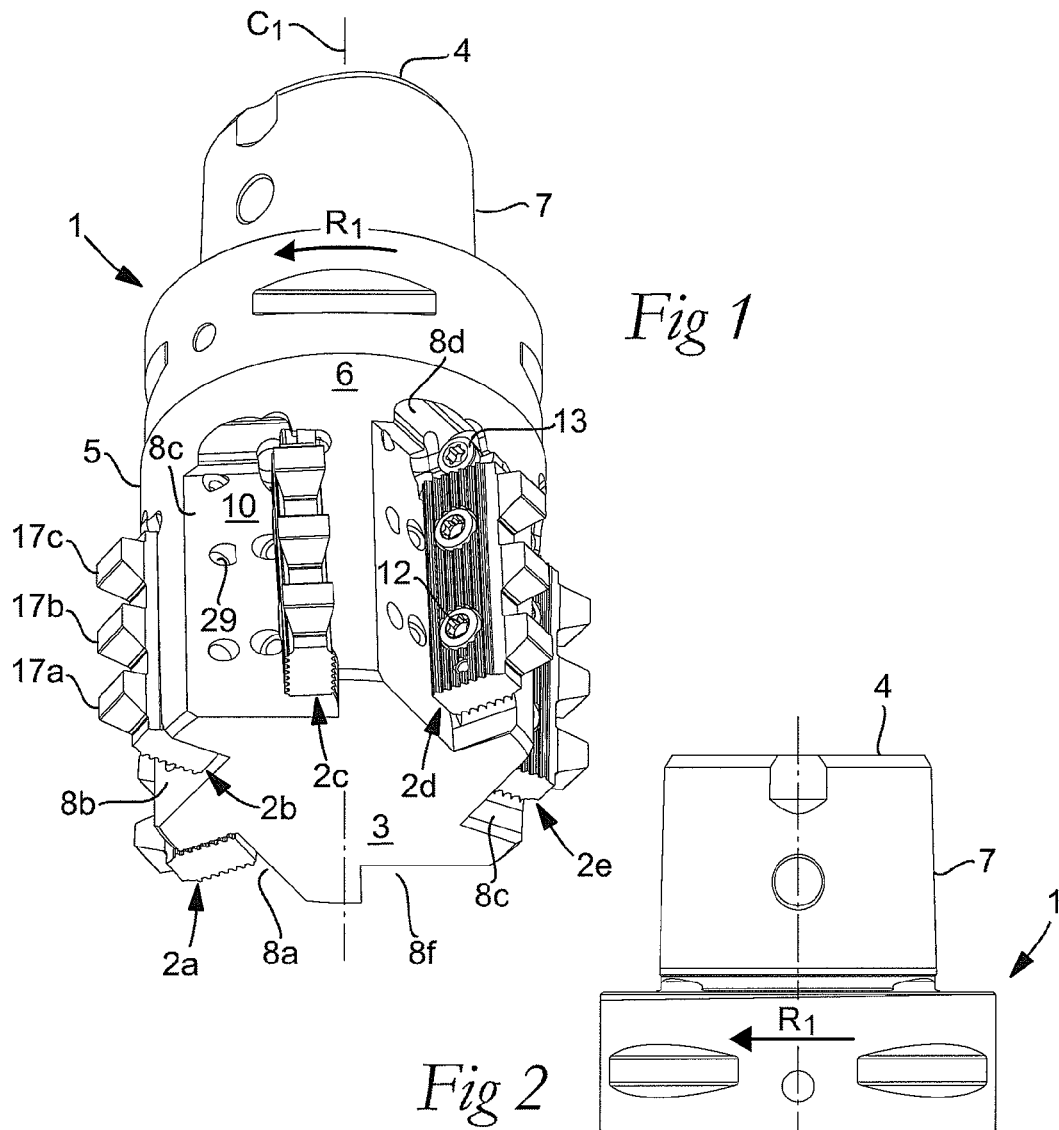
FIG. 1 is a bottom perspective view of a complete milling cutter tool according to an embodiment of the invention.
Figure 2:
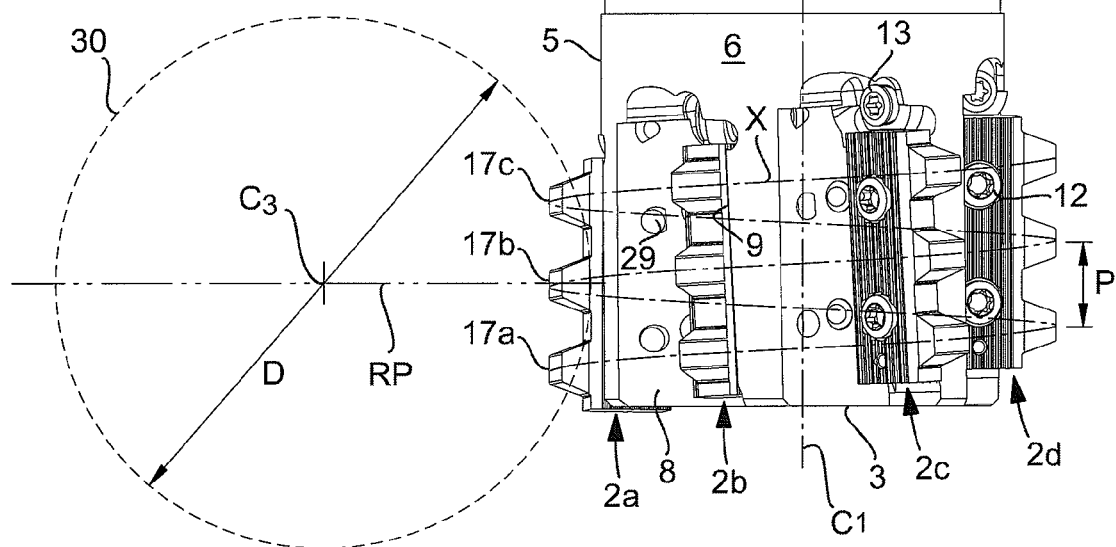
FIG. 2 is a side view of the same tool.

The milling cutter tool shown in FIGS. 1 and 2 includes a basic body 1 and a plurality of replaceable cutting bodies, which in the shown, preferred embodiment, are identical and generally designated 2. In order to individually distinguish the cutting bodies mounted in the basic body, these are designated 2a, 2b, 2c, 2d, 2e and 2f (the last-mentioned one of which is not visible in FIG. 1). The material of the cutting bodies may be harder and more wear-resistant than the material of the basic body. Advantageously, the basic body may be manufactured from steel and the cutting bodies from cemented carbide. The basic body 1 includes front and rear ends 3 and 4, respectively, between which a geometrical center axis C1 extends around which the basic body is rotatable in a predetermined direction of rotation designated R1. A front part, designated 5, of the basic body has a cylindrical envelope surface 6, while a rear part 7, which is intended to be attached in a machine in order to rotate the tool, may have a non-cylindrical cross-sectional shape, e.g., a polygon shape. The cutting bodies are mounted in seatings or chip pockets, which generally are designated 8 and which individually are distinguished from each other by means of the suffixes a-f. In the example, the two opposite ends 3, 4 of the basic body are in the form of plane surfaces, which extend perpendicularly to the center axis C1. The individual chip pocket 8 (see FIGS. 7-9) is delimited by a support surface 9, as well as a side surface 10, which in the example extends perpendicularly to the support surface 9. The side surface 10 is plane, while the support surface 9 is formed as a serration surface, i.e., a surface in which a plurality of straight, parallel ridges 9a are included, which are mutually spaced-apart by grooves 9b. In the support surface 9, two axially spaced-apart holes 11 mouth having internal threads or female threads for the receipt of male threads of screws 12 (see FIGS. 1 and 2).

In the example, the chip pockets 8 are situated in the front part of the basic body and open in the front end surface 3. In the vicinity of the inner end of the support surface 9, an adjustment mechanism 13 is arranged for adjustment of the axial position of the individual cutting body along the support surface 9. For instance, the adjustment mechanism 13 may be made in the manner disclosed in U.S. Pat. No. 6,655,879.

It should also be pointed out that the six chip pockets 8, which in the example are included in the basic body, are equidistantly spaced-apart along the periphery of the basic body (i.e. have a partition of 60°), and that the individual support surface 9 is facing forward in the direction of rotation R1 of the basic body.

Reference is now made to FIGS. 3-6, which illustrate the design of the individual cutting body 2. In the shown, preferred embodiment, the cutting body 2 has the shape of a hexahedron having a pair of opposite main surfaces 14a, 14b, a pair of opposite side surfaces or sides 15a, 15b, and a pair of opposite end surfaces 16a, 16b, between which an imaginary, axial neutral plane NP extends and is situated halfway between the two main surfaces 14a, 14b. These two main surfaces are in the example mutually parallel and each one is formed with a second set of serrations 34 in the form of cross-sectionally V-shaped, straight ridges and grooves to co-operate with the grooves and the ridges, respectively, in the support surfaces 9 of the basic body 1. Along one side 15*a* of the cutting body, a number of teeth are formed, which are generally designated 17, and individually distinguished from each other by the suffixes a, b and c. These teeth will be described in more detail below. The two end surfaces 16*a*, 16*b* are in this case plane and orientated perpendicularly to the main surfaces as well as the two sides. Furthermore, it should be pointed out that two through holes 18 mouth in the two main surfaces 14*a*, 14*b* and have the center axes C2 thereof orientated perpendicularly to the neutral plane NP.

In the prior art, the support surfaces of the chip pockets, and thereby the cutting bodies mounted in the same, run parallel to the center axis of the basic body, at the same time as the teeth of the basic bodies are set-wisely arranged in planes, which are perpendicular to the center axis; all with the purpose of enabling milling of straight notches, in which the teeth of the same plane follow each other in one and the same notch. This means that the tool cannot be used for gear hobbing.

Figure 6:
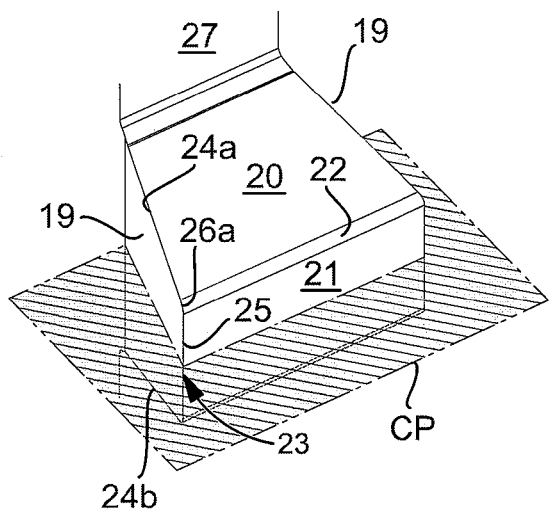
FIG. 6 is an enlarged perspective view of an individual tooth included in the cutting body.

Reference is made to FIG. 6, which in a perspective view shows the design of the individual tooth 17. Each such tooth includes two opposite chip surfaces 19, between which two flanks 20 extend as well as a back surface 21, which transforms into the flanks via arched transition surfaces 22 in the form of so-called radius transitions. Along the chip surface 19, a cutting edge, in its entirety designated 23, extends, which includes a plurality of part edges, viz. two flank edges 24*a*, 24*b* adjacent to the flanks 20, a back edge 25 to which the back surface 21 is connected, as well as two short, arched corner edges 26*a*, 26*b* adjacent to the transition surfaces 22. Halfway between the flanks 20, which in the example are plane, a central plane CP extends, which defines the length extension of the tooth.

Figure 3:
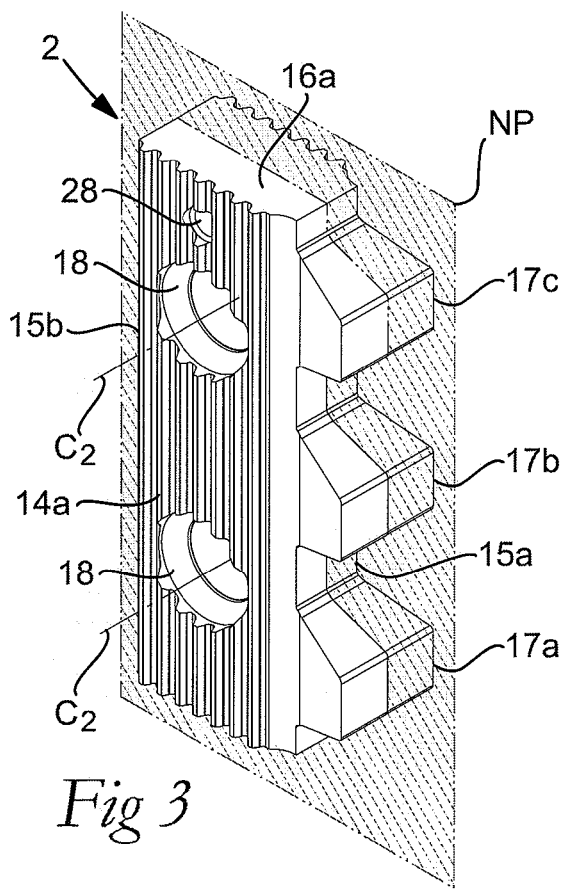
FIG. 3 is an enlarged perspective view of one of six cutting bodies, which in the example are included in the tool.
Figure 5:
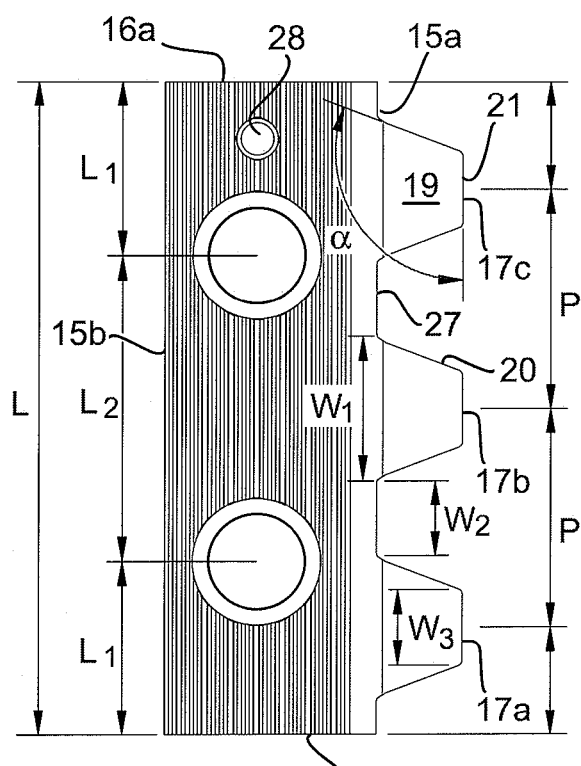
FIG. 5 is a side view of the same cutting body.

As is seen in FIGS. 3 and 5, the teeth 17*a*, 17*b*, 17*c* are cross-sectionally trapezoid and mutually spaced-apart by gaps, which are individually delimited by two opposite flanks 20, as well as a bottom 27, which in this case is in the form of a plane surface, that runs parallel to the likewise plane back surfaces 21. Furthermore, the length extension of the teeth, as represented by the central plane CP, is orientated perpendicularly to the neutral plane NP, and thereby perpendicularly to each main surface 14*a*, 14*b*. In the shown, preferred embodiment, the cutting body 2 includes three teeth, which mutually have a uniform partition P. The teeth are comparatively sturdy by having a basic width W1 amounting to at least 10% of the total length L of the cutting body between the end surfaces 16*a*, 16*b*. The obtuse angle α between the individual tooth flank 20 and the back surface 21 (and also the gap bottom 27) amounts in the example to 110°, which means that the nose angle between the flanks of one and the same tooth amounts to 40° (2×20°). Advantageously, the gap bottoms 27 have essentially the same width W2 as the back surfaces 21 (the measure W3), whereby the teeth and the gaps obtain essentially the same trapezoid cross-sectional shape. The two screw holes 18 are situated at equally large distances L1 from adjacent end surfaces 16*a*, 16*b*, while the mutual distance L2 between the screw holes is greater than the distance L1. In the example, L1 amounts to 26.5% of the total length L of the cutting body, while L2 amounts to 47%. By the fact that the distances L1 are equally large, the cutting body becomes invertible. By the side of one of the screw holes 18, a hole or seating 28 is formed, which by the operator can keep track of the orientation of the cutting body in the tool, as well as in connection with possible regrinding of the teeth of the cutting body.

Figure 4:
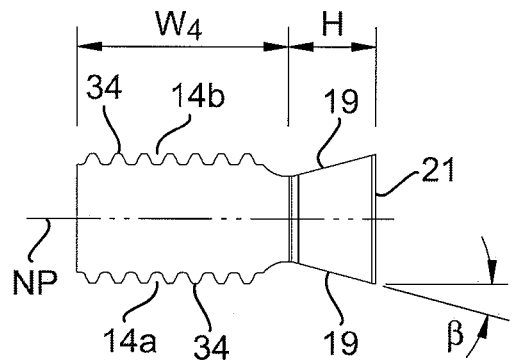
FIG. 4 is an end view of the cutting body according to FIG. 3.

In FIG. 4 it is seen that the height H of the teeth 17 is fairly great in comparison with the width W4 of the proper cutting body. Thus, in the example, H amounts to approx. 42% of W4. The chip surfaces 19 diverge toward the back surfaces 21. The angle β between the individual flank 19 and the neutral plane and main surfaces, respectively, of the cutting body, amounts in the example to 15°. In other words, the angle of divergence between the chip surfaces 19 amounts to 30°. Of course, this angle may vary, but should be within the range of 20-40°, suitably 25-35°.

Figure 7:
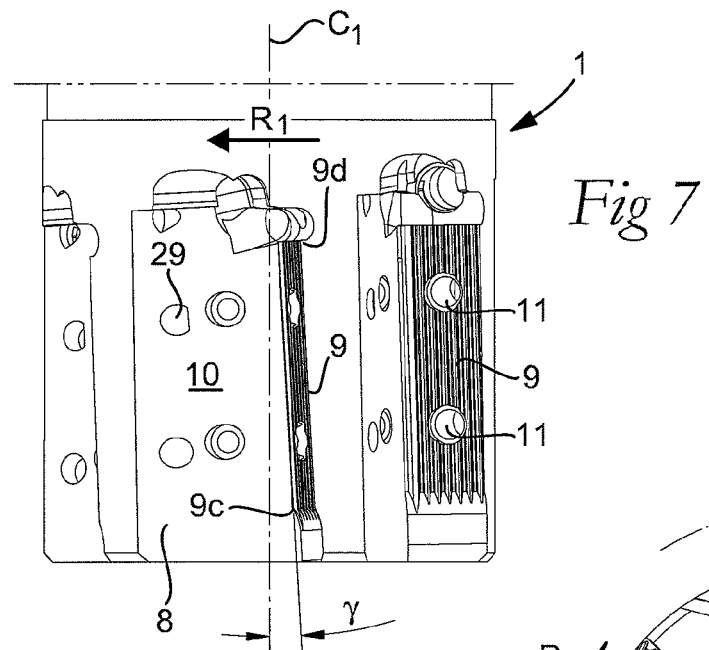
FIG. 7 is a partial side view of the basic body of the tool without any cutting bodies.

Reference is now made again to FIGS. 7-9, which illustrate that the support surfaces 9 of the chip pockets are tipped at a negative axial angle γ in relation to the center axis C1 of the basic body 1. In order to explain the concept "negative axial angle," the ends of the long narrow support surface 9 have been provided with the reference designations 9*c* and 9*d*, respectively. Of these designations, 9*c* designates a front end, which is situated closest to the front end surface 3 of the basic body, while 9*d* designates a rear end. As seen in FIG. 7, in a side view of the basic body, the rear end 9*d* of the support surface will—due to the axially negative tipping in—be in front of the front end 9*c*, when the basic body rotates in the predetermined direction of rotation R1.

If the support surface 9 had been tipped at a positive axial angle, the front end 9*c* would be in front of the rear end 9*d* as viewed in the direction of rotation. For the sake of completeness, it should also be mentioned that the axial angle would be 0° or neutral, if the support surface would run parallel to the center axis C1.

The negative axial angle γ should, on one hand, amount to at least 0.5°, but should, on the other hand, not be more than 5°. In the example, γ amounts to 3.2° (3°12'). Suitably, γ may be selected within the interval of 2-4°.

Figure 8:
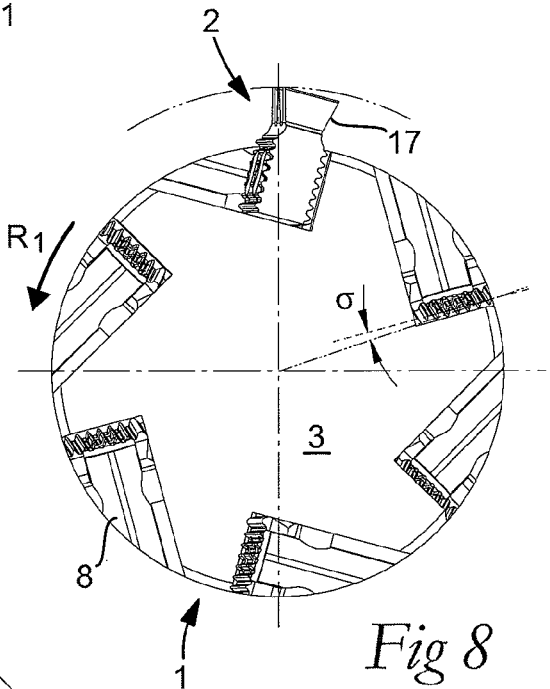
FIG. 8 is an end view of the same basic body having a mounted cutting body.
Figure 9:
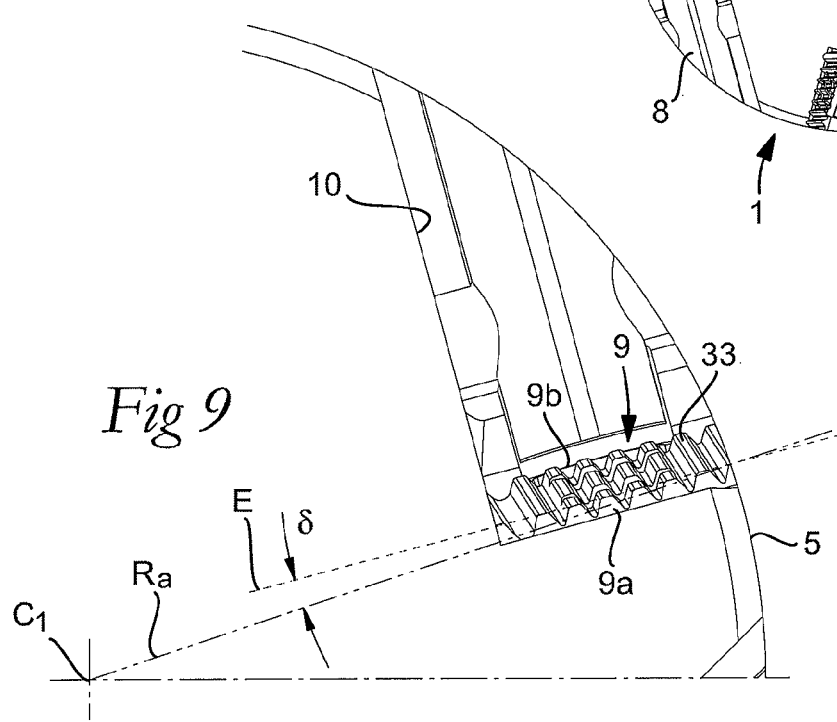
FIG. 9 is an enlarged detailed view showing a chip pocket.

As is seen in FIGS. 8 and 9, the individual support surface 9 is also tipped in at a certain, negative radial angle δ, which is the angle that is formed by the fact that a common plane E for the tops 33 of the ridges 9*a* is inclined in relation to a radius Ra, which extends from the center axis C1 of the basic body to the top of the ridge situated outermost toward the periphery. In the example, δ amounts to 3.6°; a value which is fully sufficient to give the back surfaces 21 of the teeth 17 a good clearance from the generated surfaces (see the dash-dotted circle in FIG. 8). In practice, δ should be within the interval of 0.5-10°, suitably 1-5°, and preferably 2-4°.

Because the cutting bodies 2 in the their mounted state, are kept pressed with the undersides thereof (either one of the main surfaces 14*a*, 14*b*) against the support surfaces 9 of the basic body, of course also the cutting bodies will become inclined at a negative axial angle γ. As shown in FIG. 2, the inclination of the cutting bodies entails that the different teeth 17 thereof will be located along a common, imaginary helical line or helix X, the length extension CP of the teeth following the helical line. The helical line has a pitch P, which is as great as the partition P between the individual teeth of each cutting body. In the shown, preferred example, all cutting bodies are identical. For this reason it is, in order to locate the teeth along the helical line X, also necessary to displace the cutting bodies axially in relation to each other, more precisely in steps of 1/n×P mm, where n is the number of cutting bodies, and P the partition in millimeters between the teeth of the individual cutting body, all on the assumption that the cutting bodies are equidistantly spaced-apart along the envelope surface of the basic body (i.e., that the peripheral partitions between the cutting bodies are equally large). In the example, when the tool includes six cutting bodies, the partition between the same amounts to 60°. If the partition P between the teeth would amount to 10.7 mm (such as is the case in the embodiment), the cutting bodies have to be displaced axially in relation to each other by the measure 1.8 mm (i.e. 10.7/6). This axial displacement is enabled by the fact that the different chip pockets 8 are given different lengths. Thus, the chip pocket 8a is somewhat shorter than the chip pocket 8b, which in turn is shorter than the chip pocket 8c, etc. The cutting body 2a mounted in the shortest chip pocket 8a is situated with the front end surface thereof in the immediate vicinity of the front end surface 3 of the basic body. However, the next cutting body 2b is axially displaced (1.8 mm) rearwardly from the end surface 3, the cutting body 2c 3.6 mm, and so on.

In order to attain good machining results, it is important that the position of the basic bodies along the appurtenant support surfaces can be adjusted, so that the teeth exactly follow the helical line X. This may take place by the adjustment mechanisms 13. Upon mounting of the cutting bodies, the screws 12 are first tightened preliminary, after which the adjustment mechanisms 13 are utilized to fine adjust the positions of the basic bodies before the screws 12 are finally tightened by a predetermined torque.

With continued reference to FIG. 2, it should be pointed out that ducts 29 open in the side walls 10 of the chip pockets. Via the ducts, liquid may be flushed against the cutting bodies in order to cool and/or lubricate the same. In FIG. 2, furthermore, the dashed circular line 30 designates an imaginary workpiece, having the diameter D, during machining by the tool. Horizontally from the center axis C3 of the workpiece, a reference plane RP is shown. When an arbitrary point on the envelope surface or periphery of the workpiece during the rotation of the workpiece passes the reference plane RP, this point is situated at the shortest possible distance from the tool.

Figure 11:
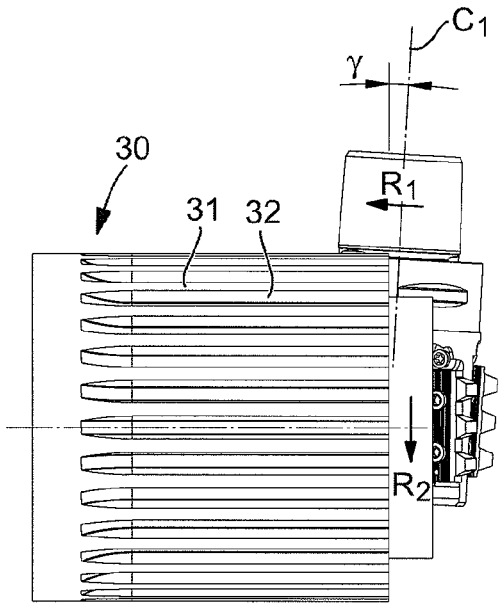
FIG. 11 is a side view of the same workpiece, with the milling cutter tool shown behind the same.
Figure 12:
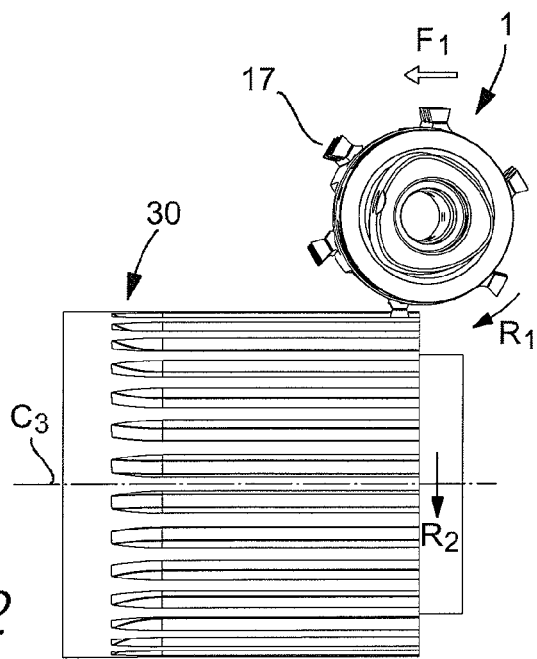
FIG. 12 is a planar view from above of the workpiece as well as the milling cutter tool.

In order to illustrate a function of the tool, reference is made to FIGS. 11-12, in which the workpiece 30 is now shown by solid lines. In practice, the workpiece may be a shaft, e.g., a driving shaft or crankshaft, which should be formed with a spline coupling in the form of long narrow, straight bars 31, which are spaced-apart by notches 32, which should be provided by the described tool. In this case, the number of bars and bar notches amounts to 38. For the sake of simplicity, these bars and notches are shown in a finish-machined state, i.e., having full length, in FIGS. 11 and 12. In the example, the workpiece 30 is set-up in an axially immovable state, in which the same can be rotated only, more precisely in the direction of rotation R2 around the center axis C3 of the workpiece.

In the following description, such concepts as "vertical", "horizontal", "upper" and "lower", respectively, will be used, which however only relate to the drawing FIGS. 10-12. In other words, the workpiece as well as the tool may be arbitrarily placed in the space provided that the same mutually assume those positions, which are shown in the figures.

In a coordinate direction as viewed in FIG. 11, the basic body 1 of the tool is inclined in relation to the vertical plane, viz. at the same angle γ as the cutting bodies 2 are tipped or inclined in relation to the center axis C1 of the basic body. As viewed in FIG. 10, the center axis C1 of the basic body is however located in the vertical plane. In addition to being rotatable in the direction of rotation R1, the tool can also be moved linearly or longitudinally fed, viz. in the direction of the arrow F1 in FIG. 12. In addition, the tool is adjustably movable laterally in the direction of the double arrow F2 (see FIG. 10) so as to make it possible to bring the same into and out of engagement with the workpiece. It is also worth pointing out that the teeth 17 of the basic bodies 2 rotate in such a way that one of the two opposite chip surfaces 19 and certain ones of the connecting part edges will meet the workpiece in an arbitrary co-ordinate point before other surfaces, i.e., the flanks 20 and the back surface 21, reach up to the same point. In doing so, the last-mentioned surfaces clear from the surfaces of the workpiece generated by the part edges along the chip surface. In the example, when the milling takes place by up milling, the removed chips will be thrown out forwardly in the feeding direction F1.

The milling operation in question, which is a so-called gear hobbing, is based on a careful adjustment and synchronization of the speeds of rotation of the tool and of the workpiece as well as the speed of the tool in the longitudinal feed direction F1. Generally, the speed of rotation of the tool should be so much greater than the speed of rotation of the workpiece as the number of desired bar grooves. If the number of bar grooves, as mentioned, amounts to 38, the speed of rotation of the tool should accordingly be 38 times greater than the speed of rotation of the workpiece. Furthermore, it may be said that the longitudinal feed speed of the tool is moderate like the speed of rotation of the workpiece.

Figure 10:
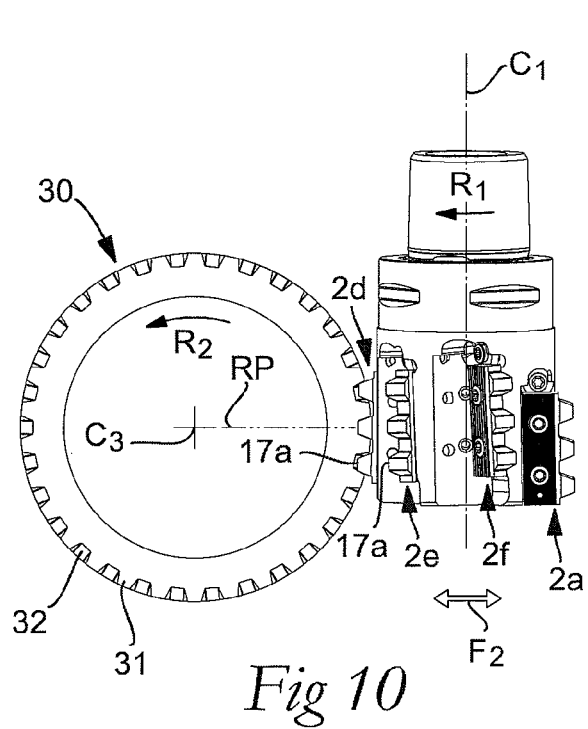
FIG. 10 is an end view of a rotatable workpiece during machining by the milling cutter tool according to an embodiment of the invention.

When an arbitrary point (lacks reference designation) along the envelope surface of the workpiece 30 during the rotation thereof in the direction of the arrow R2 (upon entering or later during the machining) approaches the reference plane RP from below, the same will first be impinged on by a tooth situated low in one of the cutting bodies 2, e.g., the tooth 17a of the cutting body 2d, such as is shown in FIG. 10 (see also FIG. 3). In doing so, the tooth 17a will remove a thin and superficially situated chip, more precisely by means of the corner edge 26a positioned at the top of the tooth (see FIG. 6) as well as parts of the adjacent part edges 24a, 25. Thereafter, the tooth clears from the workpiece. When this has rotated additionally about 1.57° (360/38×6) the tool has simultaneously rotated ⅙ of a revolution, i.e., 60°, during a limited longitudinal feed in the direction F1, the notch initiated in the point being impinged on by the tooth 17a of the trailing cutting body 2e. In doing so, the last-mentioned tooth will remove an additional chip, which is wider than the first one removed, because the upper corner edge 26a of the tooth as well as connecting portions of the part edges 24a and 25 now dig themselves deeper into the workpiece. After an additional 1.57° of rotation of the workpiece and 60° of rotation of the tool, the tooth 17a of the next cutting body 2f is brought into engagement with the workpiece and removes a chip, which is even somewhat wider than the first chips. These part operations are repeated until the rotating point or the initiated notch of the envelope surface of the workpiece reaches the reference plane RP.

Here, it should be observed that the machining of the initiated bar groove first exclusively takes place by the upper portions of the cutting edges of those teeth, which are under the reference plane RP, while the other portions of the cutting edge 23, i.e., the lower half of the back edge 25, the corner edge 26b as well as the flank edge 24b, have no contact with the workpiece.

When the initiated bar groove during the rotation thereof in the direction of the arrow R2 passes the reference plane RP, the above-mentioned phenomenon is reversed so far that only the lower part edges (the lower half of the back edge 25, the corner edge 26b and the flank edge 24b) of the cutting edges 23 of the teeth cut into the workpiece, while the upper part edges above the center plane CP (see FIG. 6) are going free or clear from the workpiece.

By adapting in a suitable way the longitudinal feed speed of the tool in relation to the speed of rotation (R2) of the workpiece 30, the machining of each initiated bar groove will, after one revolution of rotation of the workpiece commence exactly where the machining during the preceding revolution was concluded. By the fact that the cutting bodies 2 as well as the tool in its entirety are inclined at the angle γ in the way described above, the flank edges 24a, 24b of the teeth will generate surfaces, which run parallel to the center axis C3 of the workpiece in spite of the workpiece being rotated at the same time as the tool is longitudinally fed and rotated. Therefore, the diminutive part surfaces, which are generated during each tooth engagement, will together form continuous, long narrow surfaces in the form of bar flanks, which run parallel to the center axis of the workpiece.

The speed by which gear hobbing of, for instance, a spline coupling, can be carried out, may in practice be limited by a plurality of factors, such as the risk of vibrations, desired surface smoothness, available machine equipment, etc. Even if the forming of a spline coupling could take one or a few minutes, the invention, however, affords the fundamental advantage that a rotating workpiece, e.g., a workpiece which in other respects calls for turning only, can be made with straight, axially running notches of the described kind. It is even possible to carry out the gear hobbing at the same time that other machining of other parts of the same workpiece is in progress.

It should be mentioned that the milling may be carried out by up milling as well as down milling. The choice between up milling or down milling consists simply of selecting the side of the workpiece, along which the tool should operate.

Within the scope of the invention, it is possible to modify the shown tool in various ways. Thus, it is possible to design the tool with only one cutting body instead of a plurality of peripherally spaced-apart cutting bodies. When several cutting bodies are used, the axial displacement of the different teeth in relation to each other may furthermore be provided in other ways than by placing identical cutting bodies in different axial positions in relation to the end surface of the basic body. Thus, in equally long chip pockets, differently long cutting bodies may be placed, which have the teeth thereof placed in such a way that they, in the mounted state, are located along a cylindrical helical line having an even pitch. Furthermore, the cutting bodies may be formed without the possibility of being inverted, the teeth being manufactured with only one useful cutting edge, instead of two, such as has been shown in the preferred embodiment. In doing so, the cutting body may be formed with serrations only on the underside thereof, while the upperside may be made plane and smooth (e.g., in order to counteract sticking of chips). Then, the upper side and the underside do not need to be parallel to each other. Also the number of teeth of the individual cutting body may vary. In the example, where each cutting body includes three teeth, the tool is for the machining of workpieces having a small or moderate diameter. For the machining of workpieces having a greater diameter, the number of teeth may be increased. However, for most applications, a maximum of six teeth is sufficient. It is also possible to vary the profile shape of the teeth and thereby of the cutting edges in order to provide notches and bars having different profile shapes. For most applications, however, the shown, trapezoid profile shape is preferred, which generates bars having an involute profile shape. It should also be mentioned that the teeth of the individual cutting body do not necessarily have to extend perpendicularly to the neutral plane or underside of the cutting body. If it would be desirable to decrease the axial tipping-in angle for the support surfaces of the basic body, a certain inclination of the teeth in relation to the neutral plane of the cutting body could compensate the decrease. Suppose the tipping-in angle γ of the support surfaces would need to be reduced from the above-mentioned 3.2° to 2.2°. In order to retain the same active angle of action 3.2° in the tool, compensation may take place by orientating the teeth at 89° angle to the neutral plane, instead of 90°. However, in practice, the above embodiment having perpendicular teeth is preferred. In addition, it is possible to fix the cutting body against a shim plate, which in turn is fixed in relation to the support surface. Even further, it is possible to lock the cutting body in another way than by screws and serrations in the form of only straight, parallel ridges. Thus, the interface between the cutting body and the basic body could include connecting surfaces, which can lock the cutting body not only radially but also axially, wherein the need of particular adjustment mechanisms would be eliminated.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A milling cutter tool comprising:
a basic body having an envelope surface and two opposite ends, between which a geometrical center axis (C1) extends around which the basic body is rotated in a predetermined direction of rotation; and
a replaceable cutting body, which includes a pair of opposite main surfaces, one of which in a mounted state forms an underside and the other one of which forms an upperside, a pair of opposite sides, and a pair of opposite end surfaces, the cutting body further including a set of teeth which are situated with a uniform partition along one of the pair of opposite sides of the cutting body, each of the teeth including a chip surface formed adjacent to a cutting edge from which the tooth extends between a pair of flanks along a length extension which is orientated at an angle to the underside of the cutting body;
the cutting body being fixed in a pocket opening in the envelope surface of the basic body and having a support surface facing the forward direction of the direction of rotation of the basic body, against which the underside of the cutting body is mounted,
wherein the support surface of the pocket, and the underside of the cutting body, are tipped at a negative axial angle (γ) of at least 0.5° in relation to the center axis (C1) of the basic body such that the teeth of the cutting body are located along a common, phantom helical line (X), which is concentric with the center axis (C1) of the basic body and has an even pitch which corresponds to the partition between the teeth.

2. The milling cutter tool according to claim 1, wherein the axial angle (γ) amounts to at most 5°.

3. The milling cutter tool according to claim 1, wherein the support surface of the pocket is tipped at a negative radial angle (δ) of at least 0.5°.

4. The milling cutter tool according to claim 3, wherein the radial angle (δ) amounts to at most 10°.

5. The milling cutter tool according to claim 1, comprising a plurality of peripherally spaced-apart cutting bodies.

6. The milling cutter tool according to claim 5, wherein the cutting bodies are identical and peripherally equidistantly spaced-apart along the envelope surface of the basic body, and axially displaced in relation to each other in steps of 1/n×P mm, where n is the number of cutting bodies and P the partition in millimeters between the teeth of one of the cutting bodies.

7. The milling cutter tool according to claim 1, wherein the cutting body includes at least three and at most six teeth.

8. The milling cutter tool according to claim 7, wherein the each of the teeth have a basic width, which amounts to at least 10% of the length of the cutting body between the end surfaces of the cutting body.

9. The milling cutter tool according to claim 1, wherein each of the teeth of the cutting body is cross-sectionally trapezoid by including, in addition to the two flanks, a back surface towards which the flanks extend at obtuse angles ($\alpha$).

10. The milling cutter tool according to claim 9, wherein a bottom in a tooth gap which separates two adjacent teeth of the cutting body, has a width which is equal to a width of the back surface.

11. A replaceable cutting body for a milling cutter tool, the milling cutter tool including a basic body which includes an envelope surface and two opposite ends between which a geometrical center axis (C1) extends around which the basic body is rotated in a predetermined direction of rotation, at least one pocket opening in the envelope surface and having a support surface facing the forward direction of the direction of rotation of the basic body, against which a cutting body is seated, the support surface of the pocket being tipped at a negative axial angle ($\gamma$) of at least 0.5° in relation to the center axis (C1) of the basic body to locate teeth of the cutting body along a common, imaginary helical line (X), which is concentric with the center axis (C1) of the basic body and has an even pitch, the cutting body comprising:
  a pair of opposite main surfaces, one of which in a mounted state forms an underside and the other one of which forms an upperside, a pair of opposite sides, and a pair of opposite end surfaces; and
  a set of teeth which are situated with a uniform partition along one of the pair of opposite sides of the cutting body, each of the teeth including a chip surface formed adjacent to a cutting edge from which the tooth extends between a pair of flanks along a length extension which is orientated at an angle to the underside,
  wherein each of the teeth is cross-sectionally trapezoid by including a back surface towards which the flanks extend at obtuse angles ($\alpha$).

12. The cutting body according to claim 11, wherein a bottom of a tooth gap which separates two adjacent teeth of the cutting body has a width which is equal to a width of the back surface.

13. The cutting body according to claim 11, comprising at least three and at most six teeth.

14. The cutting body according to claim 11, wherein each of the teeth has a width which amounts to at least 10% of the length of the cutting body between the end surfaces of the cutting body.

15. A basic body for a milling cutter tool, comprising:
  an envelope surface and two opposite ends, between which a geometrical center axis (C1) extends around which the basic body is rotated in a predetermined direction of rotation; and
  at least one pocket opening in the envelope surface and having a support surface for seating a cutting body facing the forward direction of the direction of rotation of the basic body,
  wherein the support surface of the pocket is tipped at a negative axial angle ($\gamma$) of at least 0.5° in relation to the center axis (C1) of the basic body to locate teeth of the cutting body along a common, imaginary helical line (X), which is concentric with the center axis (C1) of the basic body and has an even pitch.

16. The basic body according to claim 15, wherein the axial angle ($\gamma$) amounts to at most 5°.

17. The basic body according to claim 15, wherein the support surface of the pocket is tipped at a negative radial angle ($\delta$) of at least 0.5°.

18. The basic body according to claim 17, wherein the radial angle ($\delta$) amounts to at most 10°.

19. The basic body according to claim 15, comprising a plurality of support surfaces, wherein the support surfaces are identical and peripherally equidistantly spaced-apart along the envelope surface of the basic body, and axially displaced in relation to each other such that each support surface—with the exception of one—is situated at a greater axial distance from the end surface than the support surface being closest in front as viewed in the direction of rotation of the basic body.

\* \* \* \* \*